Aug. 22, 1961     E. MAYER     2,997,424
PROCESS FOR MAKING VINEGAR
Filed Sept. 11, 1958
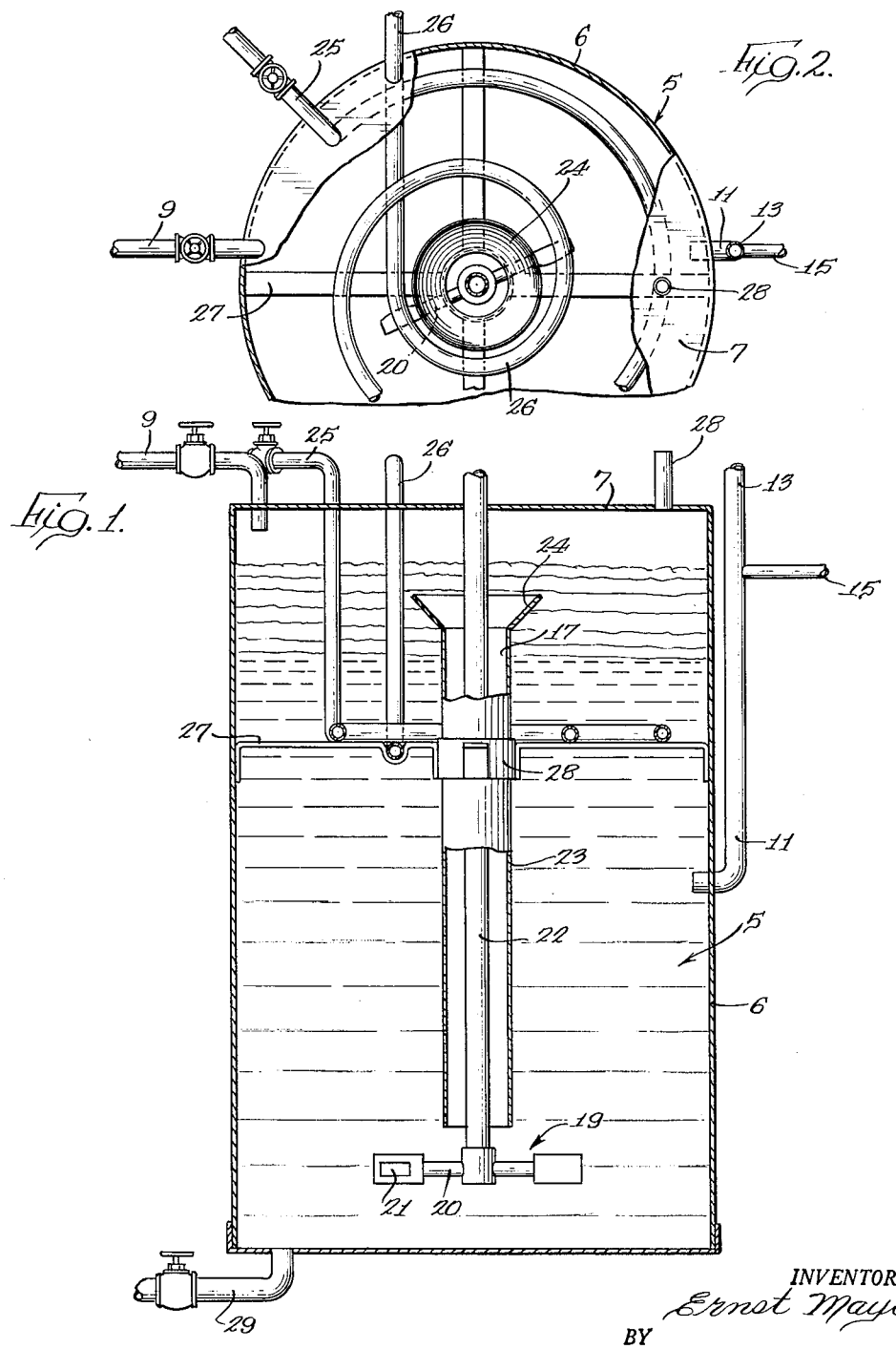
INVENTOR.
Ernst Mayer
BY
Soans, Anderson, Luedeka & Fitch
Attys.

United States Patent Office 2,997,424
Patented Aug. 22, 1961

2,997,424
PROCESS FOR MAKING VINEGAR
Ernst Mayer, Hayward, Calif., assignor to Hunt Foods, Inc., Fullerton, Calif., a corporation of Delaware
Filed Sept. 11, 1958, Ser. No. 760,328
3 Claims. (Cl. 195—49)

The present invention generally relates to the production of acetic acid and vinegar, and is more particularly directed to a continuous process for the rapid production of acetic acid and vinegar by oxidative fermentation of alcohol.

A number of processes have been employed for the commercial production of acetic acid by oxidative fermentation of ethyl alcohol. Among these processes are the so-called batch surface fermentation process, the quick vinegar surface fermentation process and batch submerged fermentation processes of various types.

The batch surface fermentation process usually comprises inoculating a batch of a suitable substrate, such as ethyl alcohol-containing liquid, with oxidizing microorganisms capable of converting the alcohol in the substrate to acetic acid by oxidation, and, after a suitable interval, passing the finished fermented batch to subsequent processing stages. Bacteria of the Acetobacter type are ordinarily utilized to bring about the desired alcohol oxidation. Such bacteria are aerobic. Accordingly, the surface of the batch is exposed to air during fermentation.

It has been found that the rate of acidification, that is, the rate of oxidative conversion of ethyl alcohol to acetic acid or vinegar, is to a large extent dependent upon the amount of oxygen available to the system. Accordingly, batch surface fermentation processes which depend for their oxygen supply upon exposure of the liquid surface to the atmosphere or other oxygen-containing gas necessarily provide relatively slow rates of acidification. Acetobacter have been found to be extremely sensitive to oxygen deficiency and, for optimal rates of propagation and for optimal viability, an adequate oxygen supply to the Acetobacter is necessary at all times.

Attempts to provide increased oxygen to the fermenting system so as to increase the rate of acidification have resulted in such processes as the quick vinegar surface fermentation process wherein ethyl alcohol-containing liquid is passed down a column containing Acetobacter deposited upon a suitable supporting material, the liquid being counter-currently contacted with a stream of air. However, this type of process, as well as various other similar commercial processes for producing acetic acid and vinegar, is subject to certain difficulties regarding accurate temperature control of the fermenting system.

It has been found that the Acetobacter are extremely sensitive to temperature fluctuations and that their action in acidifying the substrate is satisfactory only within a limited temperature range of from about 80° F. to 95° F. Overheating of the bacteria of only a few degrees results in total inhibition and/or death of the bacteria.

Accordingly, more recent batch type fermentation processes provide for greater temperature control, together with a somewhat improved means for supplying oxygen to the fermenting liquid in order to increase the propagation rate for the Acetobacter and also the rate of acidification. Such processes include the submerged fermentation type which utilizes a fermentation vessel containing air inlet at the bottom thereof for the continuous introduction of air to the fermenting liquid. Such a system also may provide heating and cooling coils to regulate to a greater degree the temperature of the fermenting liquid in order to prevent inhibition or death of the Acetobacter.

So-called "continuous" submerged fermentation techniques are in reality semi-batch processes, in that they generally provide for batch drain-off of the fermentation liquor after the acidification reaction has been allowed to proceed to completion. A portion of the fermentation liquor is then utilized to inoculate a new batch of alcohol-containing liquid in a separate vessel so as to continue the acidification process.

When the so-called "continuous" process is carried out in a single vessel, the acidification reaction is allowed to reach completion, after which the fermented liquor is withdrawn from the fermentation vessel, except for a small amount thereof which is utilized to inoculate a fresh batch of alcohol-containing liquid which is then added to the fermentation vessel.

This type of process has the disadvantage that removal of the completely fermented liquid containing the acetic acid or vinegar is essentially periodic, necessitating periodic operation of further processing steps for the completion of the commercial product. Moreover, since a fresh batch of alcohol-containing liquid is periodically added in large amount to a small amount of the finished fermented liquid containing the Acetobacter, in each instance the Acetobacter must undergo a large degree of propagation for an extended period of time until the concentration thereof in the alcohol-containing liquid is sufficient to carry the acidification reaction to completion. Accordingly, such system initially undergoes a very slow acidification rate and the average acidification rate is relatively slow.

The foregoing difficulties have been overcome by the process of the present invention which is a true continuous process, with continuous withdrawal of fermented liquid containing an optimal concentration of acetic acid or vinegar and with the simultaneous and continuous introduction of an equal amount of liquid to the system. The process of the present invention has the advantage of bringing about the oxidative conversion of ethyl alcohol to acetic acid in the introduced liquid or mash in a fermentation system which at all times contains an optimal or near optimal concentration of Acetobacter. Accordingly, the oxidative conversion proceeds at a rapid uniform rate.

Furthermore, in the continuous process of the present invention continuous aeration is provided, which is of a type which results in almost instantaneous contact of fresh mash with optimal concentrations of oxygen and Acetobacter so that acidification of the mash is immediately begun. A high rate of circulation, in a controlled pattern, of the liquid and oxygen in the fermentation system is provided, thereby obtaining substantially uniform distribution of the mash in the fermentation liquid and a uniformly high concentration of Acetobacter throughout the system. Since the oxygen concentration is maintained at maximum levels for the purposes of the Acetobacter, such bacteria are maintained in a fully viable form.

Moreover, the high rate of circulation, in a controlled pattern, within the fermentation system together with the uniform distribution of the mash, air and Acetobacter assures a uniform temperature within all parts of the system. Temperature gradients within the system, resulting from localized concentrations of Acetobacter and from localized heating from the acidification reaction, which is exothermic, are avoided. Consequently, the fermentation system can be readily maintained at a temperature which provides for maximum action by the Acetobacter in carrying out the acidification reaction.

The continuous withdrawal of acetic acid- or vinegar-containing liquid from the fermentation system, in accordance with the process of the present invention, facilitates the commercial production of the acetic acid or vinegar by enabling continuous processing of the acetic acid- or vinegar-containing liquid to the finished product to be carried out without interruption. Of even more importance, the continuous process of the present invention provides a high acidification rate to a high level, so that higher yields of acetic acid or vinegar can be obtained in shorter periods of time than with conventional processes. Moreover, the process of the present invention can be carried out with minimum equipment and with minimum supervision, further reducing the cost of production of acetic acid and vinegar.

Accordingly, the principal object of the present invention is to provide an improved process for the manufacture of acetic acid and vinegar. It is a further object of the present invention to provide a continuous process for the manufacture of acetic acid and vinegar in improved yield and at improved processing rates. It is also an object of the present invention to provide a process for the continuous production of acetic acid and vinegar in a fermentation system having a continuously substantially optimal concentration of air and Acetobacter at controlled temperature conditions.

Further objects and advantages of the present invention will be apparent from a study of the following detailed description and of the accompanying drawings, of which:

FIGURE 1 is a schematic side elevational view, partially in section, of a preferred embodiment of apparatus for carrying out the process of the present invention; and, FIGURE 2 is a schematic plan view of the apparatus of FIGURE 1, with the top thereof partially broken away to show the internal construction of the apparatus.

The process of the present invention generally comprises continuously introducing fresh alcohol-containing liquid into a fermentation zone containing substantially fully fermented liquid having an optimal concentration of Acetobacter, continuously automatically withdrawing an equal amount of the substantially fully fermented liquid, which contains acetic acid or vinegar, from the fermenting zone and continuously aerating the liquid in the fermenting zone so as to maintain substantially uniform and about optimal concentrations of air and Acetobacter in intimate contact with the fresh introduced liquid. The temperature of the system is maintained at about optimal temperature to facilitate the speed of the reaction.

Now referring more particularly to FIGURE 1, a preferred embodiment of apparatus suitable for carrying out the continuous acetic acid or vinegar producing process of the present invention, is schematically illustrated. A fermenting zone or vessel 5 is provided, which may be open at its top but which is preferably closed at its top and vented. The vessel contains fresh liquid inoculated with Acetobacter, and has means for heating the liquid. As shown in FIGURE 1, the vessel 5 is provided with suitable conduits or the like for the free entry of fresh air and removal of exhaust gases, for the addition of fresh mash or alcohol-containing liquid and for the removal of acetic acid or vinegar containing liquid. In this connection, vessel 5 is provided with a side wall 6, a top 7, an entry conduit 9 through which fresh alcohol or mash is introduced into the vessel 5 and an exit conduit 11 through which fermented liquid is removed from the vessel. An outlet 28 for exhaust gases and tank outlet 29 are also provided.

The alcohol containing liquid or mash may be any suitable liquid containing ethyl alcohol. However, the usual commercial mash utilized in the process has an ethyl alcohol content of about 12 percent by weight or less and is ordinarily obtained by sugar fermentation. Different types of alcoholic mash are presently of commercial importance. These include the so-called "distilled" mash, cider, malt, wine, corn sugar and other mashes. It should be understood that the process of the present invention can be carried out utilizing any other ethyl alcohol-containing mash which is not harmful to the Acetobacter contained within the fermentation zone.

The alcoholic mash enters vessel 5 through conduit 9 at a level above or below the liquid level in tank 5 at a continuous rate equal to the rate at which the finished vinegar or acetic acid containing liquid leaves vessel 5 through conduit 11. As shown in FIGURE 1, conduit 11 may be bifurcated to provide an air vent portion 13 which is generally vertically disposed, and a generally horizontally disposed vinegar or acetic acid exit line 15. It will be noted that line 15 is located at the level of the liquid within vessel 5 so as to provide for automatic removal, by overflow, of the finished liquor when fresh mash is added through conduit 9. Moreover, the juncture of conduit 11 with vessel 5 is located at a point distant from conduit 9, well below the liquid level and relatively near to the aeration means 17 provided for the system.

The aerating means 17 is preferably an air dispersing device which is adapted for bringing air into solution in the liquid at a high rate. Moreover, the dispersion device 17 provides for a high rate of circulation of the liquid within vessel 5 and immediate and intimate contact of the fresh mash with air and Acetobacter in a controlled flow pattern.

The aerating means may establish regions of cavitation within the liquid being aerated, into which regions is fed oxygen or air to be brought into solution in the liquid. The cavitation is brought about by rapid relative movement between a solid (for example, a rotor) and a liquid, so that they separate to produce one or more cavities or voids along the surface of the solid. These cavities provide a large area of contact between the air and the liquid, and thus promote the dissolving of the air in the liquid.

As illustrated in FIGURE 1, the dispersion device 17 comprises a generally horizontally disposed rotor 19 located below the liquid level and adjacent the bottom of vessel 5. Rotor 19 has horizontally extending arms 20. Adjacent the outer end of the arms, there are provided apertures 21 through which air is rapidly passed for dispersion and absorption. Rotor 19 is connected by means of vertical shaft 22 with a power source (not shown) for rapid rotation. Shaft 22 has associated with it an air passageway (not shown) for the continuous rapid introduction of air into the rotor during rotation thereof.

A hollow, generally vertical draft tube 23 is disposed wholly below the liquid level in vessel 5 and around and spaced from shaft 22. The lower end of draft tube 23 terminates immediately above rotor 19, and the upper end is provided with a flared upwardly and outwardly extending portion 24. Heat exchange means 25 are also provided for controlling the temperature of the liquid in tank 5. Such means may comprise, as shown particularly in FIGURE 2, cooling and heating coils 26 disposed around and spaced from draft tube 23. Draft tube 23 is also supported in tank 5 by suitable support means, as, for example, generally horizontally disposed brackets 27 connected, as by welding or the like, to the side wall 6 of tank 5 and to a ring 28 girdling draft tube 23.

Rotation of the rotor of the apparatus schematically represented in the accompanying drawings at a sufficiently high speed, for example, several hundred revolutions per minute, depending on the size of the rotor and other factors, causes cavitation within the liquid and rapid aeration thereof. Moreover, rapid circulation of the liquid within the vessel occurs as a result of the rotation. Liquid is continuously drawn down the draft tube 23 and into intimate contact with air in finely dispersed form in the region of rotor 19, and is then moved outwardly from the rotor and upwardly for recirculation through the draft tube. The cavitation aeration provides for intimate contact of all the liquid in the fermentation vessel with air from the rotor. Accordingly, alcoholic mash newly entering vessel 5 from conduit 9 is almost instantaneously brought into intimate contact with air from rotor 19 and is then uniformly dispersed in the fully aerated liquid in intimate contact with an about optimal concentration of Acetobacter for rapid oxidative conversion to acetic acid.

It should be understood that any other suitable dispersion means or other means for thoroughly, rapidly and continuously aerating the fermenting liquid in vessel 5 below the surface thereof and which provides for rapid circulation of the liquid within the vessel and for intimate and immediate contact of fresh mash with a suitable supply of air and Acetobacter would be suitable for the purposes of the present invention. Such means should assure continuous substantially uniform distribution of air, mash and acetobacteria essentially to all parts of the fermentation system.

Start-up of the process in accordance with the present invention comprises initially introducing fresh alcoholic mash to the fermentation vessel 5 through conduit 9, together with a suitable culture of the Acetobacter. The Acetobacter culture, for example, may be provided by a suitable amount of fermented acetic acid or vinegar containing liquid withdrawn from another previous operation of the same process and kept viable through continuous contact with air. Alternatively, Acetobacter may be provided for the system by any other suitable means. For example, Acetobacter culture grown on wood chips or other suitable carrier may be utilized.

In order to prevent inhibition of the Acetobacter culture due to lack of a sufficient oxygen supply following its introduction into the vessel, the aerating means 17 is immediately started up, that is, rotor 19 is rapidly rotated while air is being supplied to it and disseminated from it, supplying air to the liquid in vessel 5 at a rapid rate. Air may, for example, be supplied to the vessel at the rate of 35 cubic feet per hour per gallon of alcohol produced in a 24 hour period. Immediate propagation of the Acetobacter is thereby initiated. At the same time, the heat exchanger 25 is brought into operation by circulation of a medium, as for example hot or cold water, through coils 26, to rapidly increase the temperature of the fermenting liquid to within the desired range of 80° F. to 95° F., and to maintain that temperature thereafter.

No fresh alcoholic mash is then added to the system until an optimal concentration of the Acetobacter is propagated, and the conversion of alcohol into vinegar has progressed to a point where no more than 0.3% alcohol is contained in the mash. Furthermore, no mash is withdrawn from the vessel 5 until that time.

The rate of fermentation of the alcoholic mash to acetic acid by acidification increases as the Acetobacter culture rapidly propagates in the presence of the highly aerated liquid. When the acetic acid concentration is at or about the end point, usually from about 6 to 12 percent of acetic acid by weight, that is, when the ethyl alcohol concentration is reduced to approximately 0.3 percent, the Acetobacter culture within the fermentation system in vessel 5 is also at about optimal concentration. The system is then put on continuous operation, that is, fresh alcoholic mash is then continuously introduced into vessel 5 while fermented liquid is continuously withdrawn, and the system is continuously aerated.

In full continuous operation, according to the process of the present invention, the amount of fresh alcoholic mash continuously flowing into the fermentation system in vessel 5 is exactly counterbalanced by the amount of finished acetic acid or vinegar containing liquid leaving vessel 5 through conduit 11 and line 15. This is accomplished by virtue of the fact that the new mash added to the system tends to increase the liquid level and thereby increase the hydrostatic pressure, due to the increased height of the liquid. This results in the flow of finished acetic acid or vinegar-containing liquid from the vessel, exactly maintaining the liquid level at its original point. The withdrawal of finished liquid from the system is fully automatic and entirely dependent upon the rate of inflow of fresh alcoholic mash to the system.

The rate of introduction of fresh mash into vessel 5 during continuous operation will necessarily depend upon the rate of production of acetic acid or vinegar by the acidification reaction. Such rate of acidification in turn depends upon the concentration of Acetobacter in the system, the presence of a sufficient amount of air in contact with the Acetobacter to maintain full viability of the Acetobacter, and the temperature of the system.

Since the amount of and rate of circulation of the fermenting liquid within the system may be very high, of the order of about 3500 gallons in the tank, and the liquid passes down the draft tube 23 at the rate of about 150 to 400 gallons per minute, no problems arise regarding localized heating due to the exothermic reaction. The desired temperature of the fermenting liquid is readily maintained throughout the entire process, that is, within the range of from about 80° F. to about 95° F. The heat exchanger 25 assures maintenance of the desired temperature after the system has reached such temperature.

The aerating means 17 is continuously operated throughout the process. Since the system when continuously operated is maintained essentially uniform as to temperature, rate of acidification and concentration of constituents of the fermenting liquid and other factors, aeration is preferably carried out at a fixed rate throughout the entire process.

Simultaneously with the continuous introduction of the fresh alcoholic mash, the finished product is withdrawn from the vessel 5 through conduit 11 and line 15, as previously described. Exhaust gases simultaneously and continuously escape through line 28.

The process can be operated indefinitely on this completely continuous basis, a steady rate of yield of high quality acetic acid-containing liquid being continuously obtained.

When it is desired to terminate the process, the introduction of fresh alcoholic mash is discontinued and vessel 5 may then be drained by a bottom drain, line 29 or the like. Introduction of air into vessel 5 by the aerating means 17 can also be discontinued, unless it is desired to maintain a portion of the fully fermented liquid fully aerated to preserve the Acetobacter for inoculation of fresh alcoholic mash in other vessels or the same vessel.

Although the process of the present invention has been described with particular reference to the apparatus illustrated in FIGURES 1 and 2, any other suitable apparatus which includes an aerating means, and which provides other means for carrying out the steps of the present process is suitable. In this connection, the apparatus should include means for the continuous introduction of fresh mash at a controlled rate into a zone containing substantially fully fermented solution and an at least near optimal concentration of Acetobacter. The zone should be maintained fully aerated, and an effective heat exchange system should be provided to carefully control the temperature. Means should also be provided for continuously removing, preferably automatically, finished acetic acid or vinegar containing liquid from the fermenting zone without interrupting the process. A relatively high liquid circulation rate in the fermenting zone should also be maintained for optimal temperature control.

The following example more particularly sets forth certain features of the present invention:

*Example*

A 3,400 gallon tank, equipped with an alcoholic mash inflow conduit, heat exchanger, aerating cavitation means and outflow bifurcated conduit, substantially as shown in FIGURES 1 and 2 of the accompanying drawings, was filled to the level of the exit line in the outflow conduit with an alcoholic mash. The mash was prepared from fermentation of apple juice and contained approximately 6 percent by weight of ethyl alcohol, together with a starting culture of Acetobacter. The starting culture was fully fermented apple juice containing between 4 and 6 percent by weight of the acetic acid and a high concentration of Acetobacter.

At the same time, the rotor was brought into operation, with the rotor operating at a speed of about 600 r.p.m. and supplying approximately 20 cubic feet of fresh air to the system per minute. The fermenting liquid was continuously circulated at about the rate of about 300 gallons per minute through the aerating means. The heat exchanger was then supplied with water to maintain a temperature of the fermenting liquid within the range of from about 80° F. to 95° F. The aerating means was continuously operated at the indicated speed until a concentration of about 60 grains of acetic acid was reached in the fermenting liquid, indicating substantial completion of the acidification reaction. The Acetobacter in the fermenting liquid propagated to an optimal concentration by the time the end point for acidification had been reached.

Fresh alcoholic mash was then continuously introduced into the fermenting solution at the rate of approximately 0.75 gallon per minute, the same amount of acetic acid containing fermented liquid being automatically withdrawn from the tank by overflow from the outlet line. The rate of aeration and circulation of fermenting liquid, and the temperature of the fermenting liquid were kept constant. Since the fresh mash was continuously introduced in small amounts in proportion to the amount of fermenting liquid in the tank and at a point remote from the outlet line, the withdrawal of unfermented mash from the outlet was substantially completely avoided.

The fresh mash added to the top of the solution in the tank was immediately carried down through the draft tube of the aerating means and subjected to intimate contact with air and Acetobacter adjacent the bottom of the tube and rotor. Accordingly, acidification of the aerated fresh mash began almost as soon as the fresh mash entered the tank. The rapid continuous circulation of the fermenting liquid also assured intimate contact of the fresh mash with the optimal concentration of Acetobacter. The heat generated by the oxidation of the alcohol in the acidification reaction remained constant, so that the temperature was readily controlled.

The continuous process was operated for a period of many months with a continuous yield of 0.75 gallon per minute of fully fermented solution containing approximately 60 grains of acetic acid.

The above example clearly illustrates the fully continuous process of the present invention for the production of acetic acid or vinegar continuously in high yield. In accordance with the process of the present invention, ethyl alcohol is continuously rapidly converted to acetic acid or vinegar by oxidative fermentation brought about by optimal concentrations of viable Acetobacter. The temperature of the fermenting liquid is easily controlled and the fermenting liquid is fully and rapidly aerated.

The process of the present invention allows for full temperature, aeration and acidification rate control. Moreover, Acetobacter can be rapidly propagated to full strength when the process is started up. Ease of start up, continuous operation and shut-down are further advantages for the process.

Such modifications in the steps of the process of the present invention and in the equipment and materials for carrying out such process as are within the skill of those versed in the art are contemplated as being within the scope of the present invention.

I claim:

1. The process for the continuous manufacture of acetic acid, which comprises the steps of continuously introducing fresh liquid containing ethyl alcohol and water into a substantially fully fermented solution comprising water, acetic acid and Acetobacter, the latter in optimal concentration, in a fermentation zone, said acetic acid having been oxidized in situ by said Acetobacter from ethyl alcohol, continuously rapidly contacting throughout said zone said fresh liquid with air provided by an aerating means by establishing and maintaining cavitation at the point of introduction of air to said zone so as to maintain said Acetobacter at about optimal concentration throughout said zone, said cavitation effecting continuous rapid circulation and aeration of said liquid throughout said zone, continuously withdrawing from said solution in said fermenting zone at a point remote from the point of introduction of said fresh liquid an amount of said solution equal to the amount of said fresh liquid being continuously introduced into said solution, and continuously maintaining the temperature of said solution throughout said zone at between about 80° F. and about 95° F. to maintain the optimum viability for said Acetobacter.

2. The process for the continuous manufacture of acetic acid, which comprises the steps of initially introducing a fresh liquid containing ethyl alcohol and water and a culture of Acetobacter into a fermenting zone to form a fermenting mixture, establishing and maintaining a region of cavitation in said zone, rapidly contacting said mixture with air in said region, thereby continuously aerating said mixture at a rapid rate so as to uniformly disperse air throughout said mixture and effecting rapid circulation of said mixture throughout said zone, increasing the temperature of said mixture to between about 80° F. and about 95° F. and maintaining the temperature throughout said zone, continuously adding fresh liquid containing alcohol and water into said mixture in said zone at a uniform rate after substantially all of said alcohol of said mixture is converted by oxidative fermentation to acetic acid and continuously withdrawing said mixture from said zone at a point in said mixture remote from the point of introduction of said fresh alcohol containing liquid and at a rate equal to the rate of introduction of said fresh alcohol containing liquid, while maintaining by means of the cavitation said temperature within said range and while continuously aerating said mixture and circulating said mixture throughout said zone.

3. The process for the continuous manufacture of acetic acid which comprises the steps of introducing into a fermenting zone, having an outlet line, a fresh liquid containing alcohol and water and a culture of Acetobacter to form a fermenting mixture, said liquid and culture being added to said zone until the liquid level in said zone approximates that of the level of the outlet line, establishing and maintaining a region of cavitation in said zone, rapidly contacting said mixture with air in said region, thereby uniformly and continuously aerating said fermenting mixture, and thereby rapidly circulating said mixture throughout said fermenting zone, increasing the temperature of said mixture within the range of between about 80° F. and 95° F. and maintaining said temperature throughout said zone until said ethyl alcohol is substantially completely converted by oxidative fermentation by said Acetobacter to acetic acid throughout said zone, then, while maintaining throughout said zone said aeration at a constant rate and said temperature within said range, introducing to said mixture at a continuous rate and substantially simultaneously throughout said zone fresh liquid containing ethyl alcohol and water while continuously withdrawing said mixture from said fermenting zone by overflow through said outlet line and at a rate equal to the rate of introduction of said fresh liquid.

References Cited in the file of this patent

UNITED STATES PATENTS

| | | |
|---|---|---|
| 1,948,836 | Ash | Feb. 27, 1934 |
| 2,707,683 | Hromatka et al. | May 3, 1955 |

FOREIGN PATENTS

| | | |
|---|---|---|
| 486,481 | Great Britain | June 3, 1938 |
| 179,283 | Austria | Aug. 10, 1954 |